United States Patent
Kawakami et al.

(12)

(10) Patent No.: US 6,934,627 B2
(45) Date of Patent: Aug. 23, 2005

(54) ROUTE GUIDANCE APPARATUS AND METHOD

(75) Inventors: Takashi Kawakami, Kawagoe (JP); Masaya Hashida, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/391,528

(22) Filed: Mar. 19, 2003

(65) Prior Publication Data

US 2003/0236616 A1 Dec. 25, 2003

(30) Foreign Application Priority Data

Mar. 19, 2002 (JP) ........................................ 2002-075539

(51) Int. Cl.$^7$ .............................................. G01C 21/00
(52) U.S. Cl. ...................... 701/210; 701/201; 701/211
(58) Field of Search ................................. 701/200, 201, 701/207, 210, 211, 213; 342/357.12, 357.13; 340/988, 995.1

(56) References Cited

U.S. PATENT DOCUMENTS 5,654,892 A     8/1997   Fujii et al.
6,108,604 A     8/2000   Fukaya et al.
6,151,552 A  * 11/2000   Koizumi et al. ............ 701/211

FOREIGN PATENT DOCUMENTS

EP     0 877 348 A3    11/1998
EP     0 877 348 A2    11/1998

* cited by examiner

*Primary Examiner*—Yonel Beaulieu
(74) *Attorney, Agent, or Firm*—Sughrue Mion, PLLC (57) ABSTRACT

When a moving body (e.g., a car) is entering a roundabout, a navigation machine extracts link data of the roundabout from road map data. The navigation machine detects a route entering the roundabout (i.e., a route the moving body is currently taking), a center of the roundabout, and an exiting route based on the link data to determine an angle of the exiting route with respect to the entering route. A direction mark having the exiting route angle is prepared as a heading direction guidance image. The navigation machine can show an appropriate route (direction) at the roundabout without increasing the amount of stored image data.

16 Claims, 14 Drawing Sheets

ROUTE GUIDANCE APPARATUS AND METHOD

BACKGROUND OF THE INVENTION

1. Field of the Invention

The present invention relates to an apparatus and a method for guiding a person or an object (e.g., a vehicle) to a specified destination by use of a map.

2. Description of the Related Art

Figure 1:
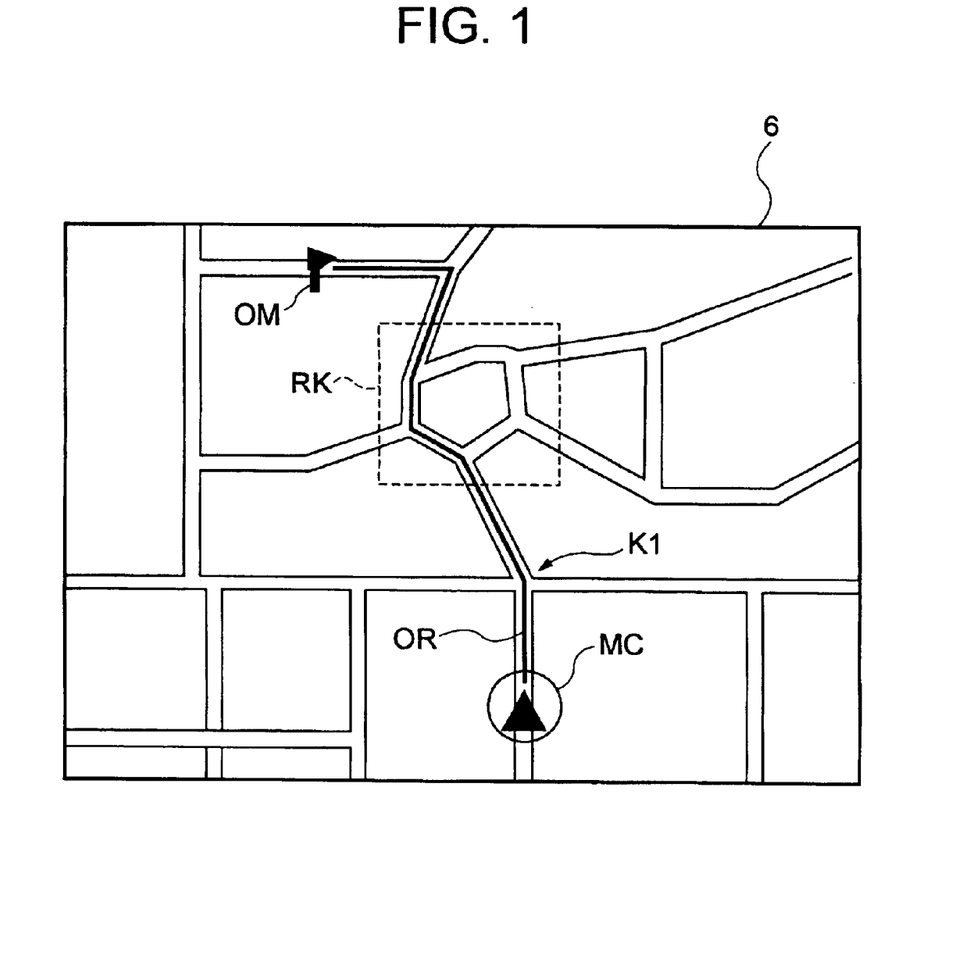
FIG. 1 illustrates a map displayed in a screen of a navigation apparatus.
Figure 2A:
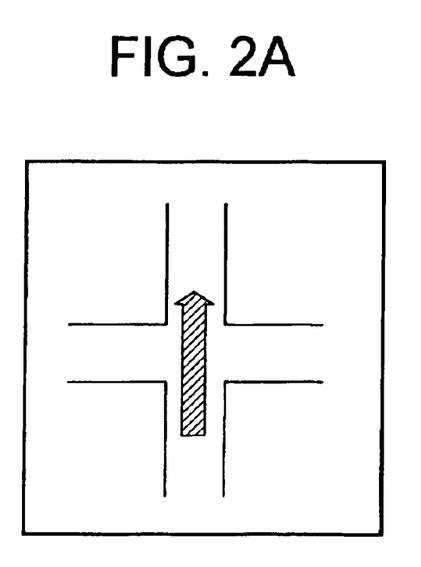
FIG. 2A illustrates a heading direction guidance image to guide a vehicle straight.
Figure 2B:
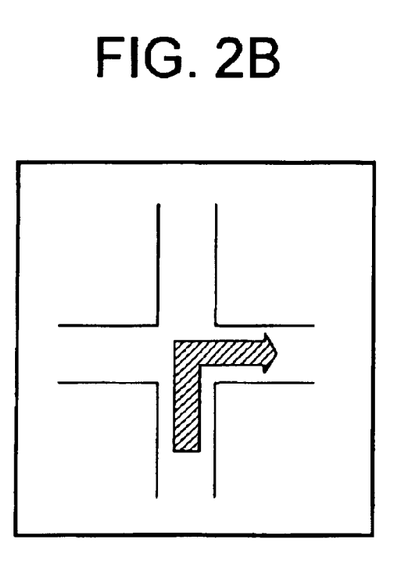
FIG. 2B illustrates another heading direction guidance image to guide the vehicle to the right.
Figure 2C:
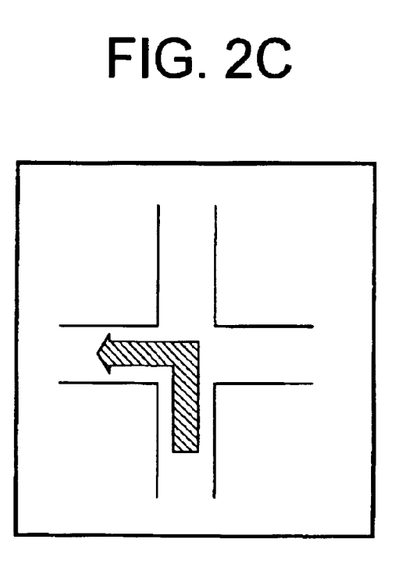
FIG. 2C illustrates still another heading direction guidance image to guide the vehicle to the left.

A car navigation apparatus is known as an apparatus for guiding a person or vehicle to a specified destination by using a map (more specifically, by showing a detailed route to the destination). In general, the car navigation apparatus utilizes a GPS (Global Positioning System) and a satellite to determine (detect) a current location of the vehicle. Referring to FIG. 1 of the accompanying drawings, a screen of a display unit 6 of the car navigation apparatus is illustrated. After detecting the current location of the vehicle, the car navigation apparatus superposes a car location mark MC over the detected car location on the map displayed by the display unit 6. When a driver or passenger in the vehicle specifies a destination OM, the car navigation apparatus determines an optimal route OR to the destination OM from the current car location MC, and displays, for example, a red line (indicated by the bold line in FIG. 1) over or along the optimal route. If the vehicle approaches a crossing on the way to the destination OM, the navigation apparatus superposes a heading direction guidance image over the displayed map. The heading direction guidance image indicates which route the vehicle should take at the crossing. FIGS. 2A to 2C of the accompanying drawings are the heading direction guidance images. The images of FIGS. 2A to 2C may be created by a deforming technique. FIG. 2A illustrates the guidance image to guide the vehicle straight. FIG. 2B illustrates the guidance image when the vehicle should turn to the right at the crossing. FIG. 2C illustrates the guidance image to guide the vehicle to the left. These guidance images are prepared beforehand on the assumption that every corner has a turning angle of about 90 degrees. It should be noted that the term "crossing" includes not only a three-way crossing, a four-way crossing but also a roundabout (also known as a traffic circle) in this specification.

However, all the corners on the road are not right angle corners, as understood from the map shown in FIG. 1. For instance, two of the four corners at the crossing K1 are not 90-degree corners. The conventional navigation apparatus includes only the three guidance images shown in FIGS. 2A to 2C.

If the vehicle approaches the crossing K1 on the way to the destination OM, practically no problem will occur because the driver understands that the driver should go a little diagonally, rather than making a 90-degree turn, even if the driver sees the guidance map of FIG. 2A (i.e., "go straight" guidance). This is because there are only three choices at the crossing K1.

Figure 3:
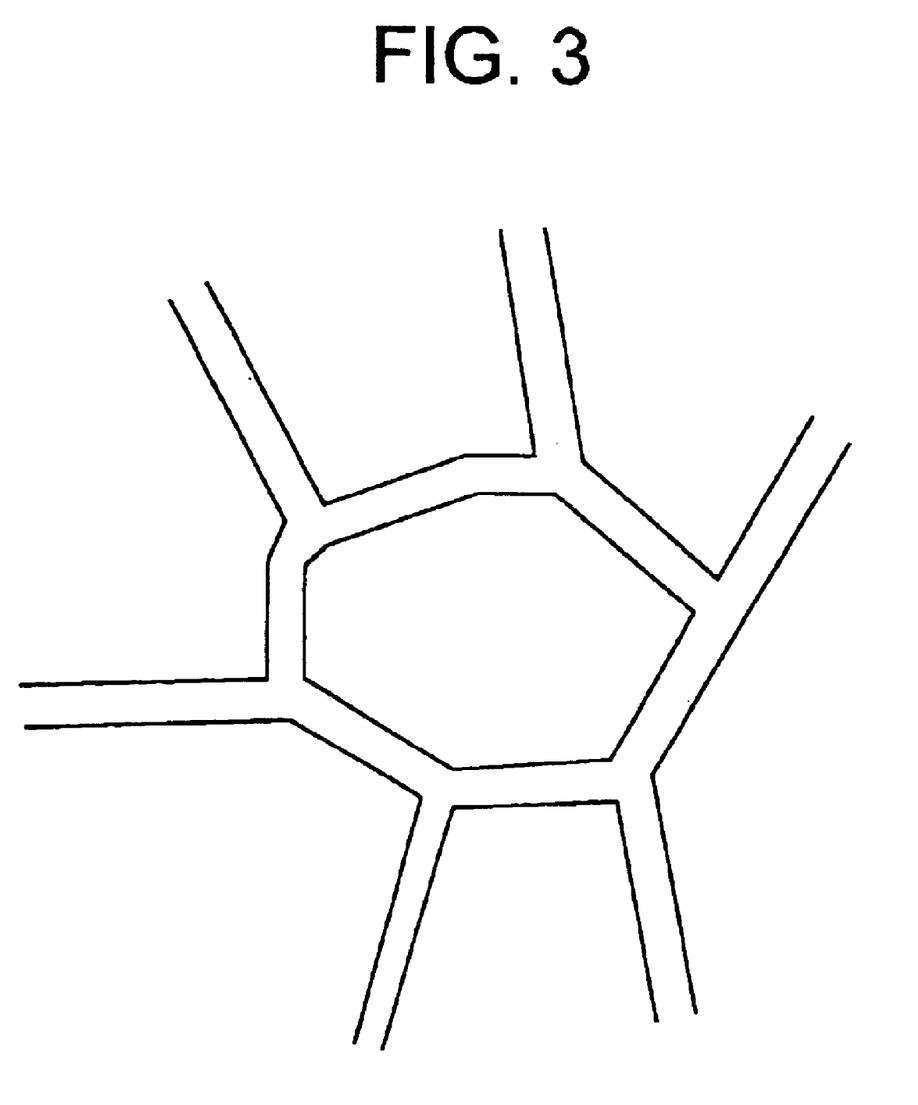
FIG. 3 illustrates an example of a roundabout on a street.

On the other hand, if the vehicle is entering a complicated crossing such as a circle or roundabout, there may be four or more directions to choose. In FIG. 1, for example, the roundabout RK has five branching routes, and the vehicle entering the roundabout RK has four routes to choose. The branching routes extend in different directions. FIG. 3 of the accompanying drawings shows another roundabout which has six branching routes and presents five choices. There may be different types of roundabouts on the streets. The conventional car navigation apparatus has only three guidance maps as shown in FIGS. 2A to 2C so that the car navigation apparatus cannot provide the driver with appropriate guidance information when the vehicle approaches the roundabout. It might be theoretically possible to prepare many guidance maps to match all roundabouts on the streets. This is however impractical since a huge amount of image data must be stored.

SUMMARY OF THE INVENTION

One object of the present invention is to provide a route guidance system incorporated in a car navigation apparatus and a route guidance method which can show an appropriate route to a driver even when the vehicle approaches a roundabout, without increasing the amount of stored image data.

According to one aspect of the present invention, there is provided a route guidance apparatus for displaying a heading direction guidance image in a display unit when a moving body (e.g., a vehicle) enters a circular roundabout having a plurality of branching routes extending from the roundabout, the moving body taking a first route of the branching routes to enter the roundabout and a second route of the branching routes to exit the roundabout, the apparatus comprising: a link data extractor for extracting link data of the roundabout from road map data; a calculator for determining an angle between the first and second routes based on the link data as an exiting angle of the roundabout; and an image generator for preparing an image showing a direction of the exiting angle as the heading direction guidance image.

The heading direction guidance image may be an image made by a deforming process. The route guidance apparatus prepares the heading direction guidance image which can guide the moving body in an appropriate direction that matches an actual shape of a roundabout, every time the moving body approaches a roundabout. Therefore, it is not necessary to store a number of heading direction guidance images for all roundabouts existing on roads beforehand. In other words, only a small amount of image data stored for the heading direction guidance image is necessary.

According to another aspect of the present invention, there is provided a route guidance method for displaying a heading direction guidance image in a display unit when a moving body enters a roundabout having a plurality of branching routes extending from the roundabout, the moving body taking a first route of the branching routes to enter the roundabout and a second route of the branching routes to exit the roundabout, the method comprising: extracting link data of the roundabout from road map data; calculating an angle between the first and second routes based on the link data as an exiting angle of the roundabout; and preparing an image showing a direction of the exiting angle as the heading direction guidance image.

DETAILED DESCRIPTION OF THE INVENTION

Embodiments of the present invention will be described with reference to the accompanying drawings.

Figure 4:
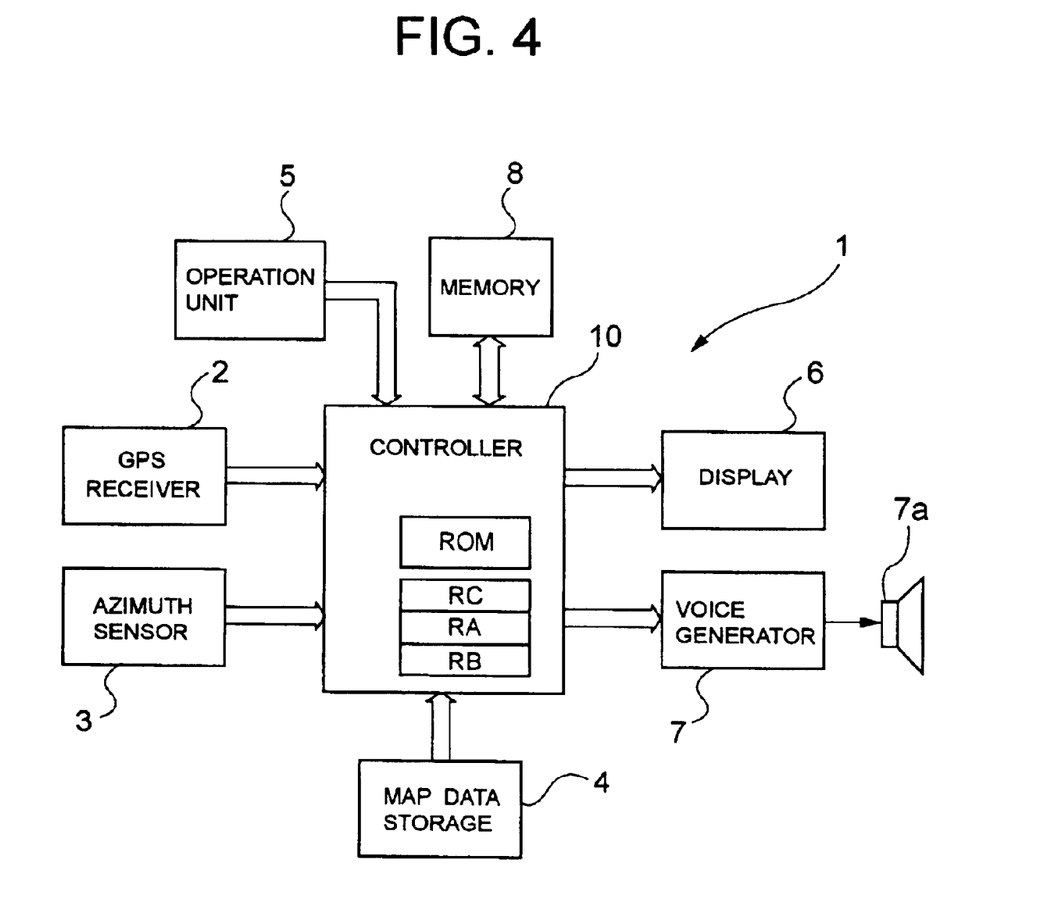
FIG. 4 illustrates a block diagram of a car navigation apparatus according to one embodiment of the present invention.

Referring first to FIG. 4, a schematic structure of a car navigation apparatus 1 which includes an improved route guidance system is illustrated. A vehicle (not shown) is equipped with the car navigation apparatus 1.

Figure 5:
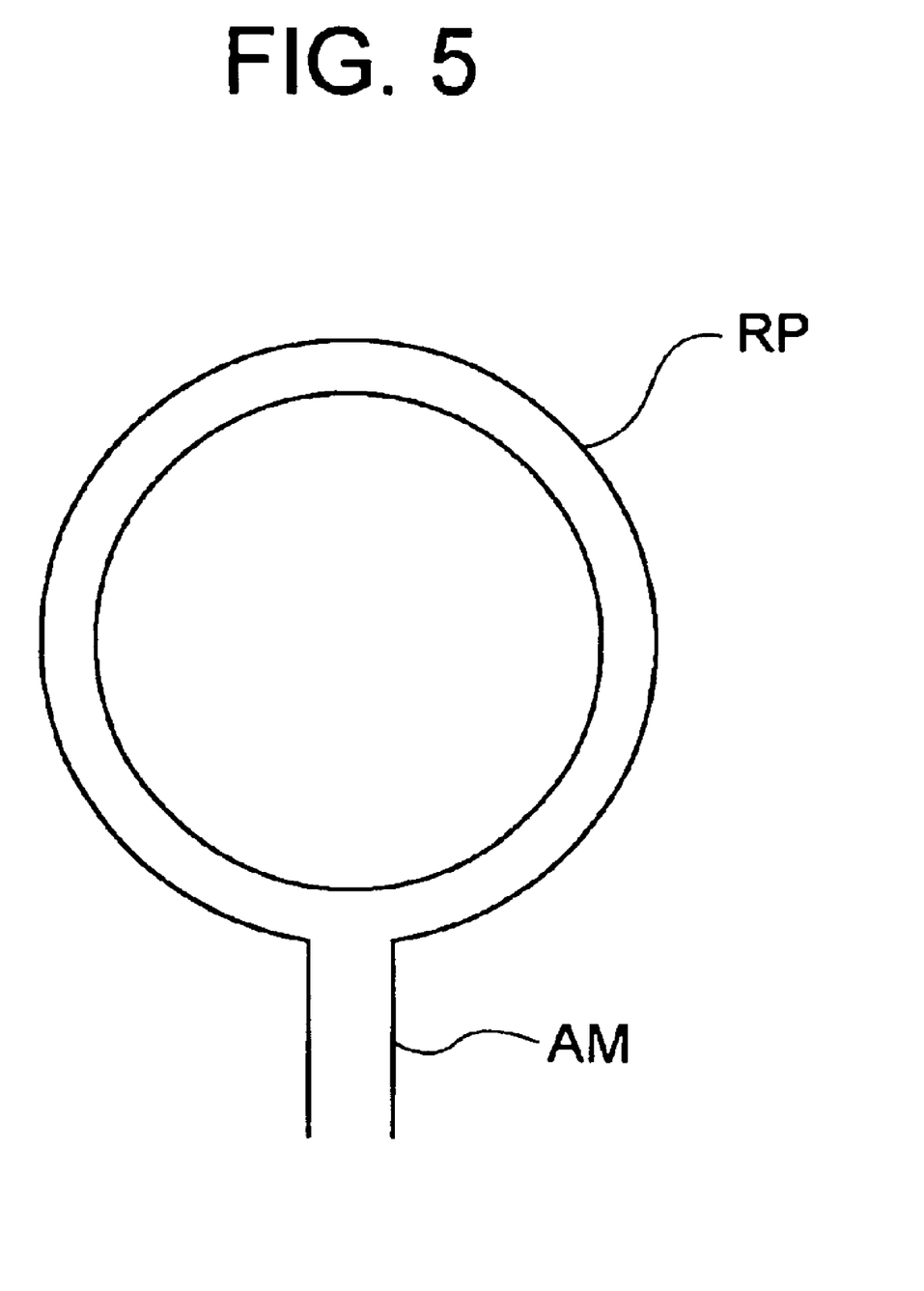
FIG. 5 illustrates a deformed image of a basic roundabout together with an entering route.

In this drawing, a GPS receiver 2 receives a radio wave from a GPS satellite (not shown) to determine a current location of the vehicle, and supplies vehicle's current location information to a controller 10. An azimuth sensor 3 detects a currently heading direction of the vehicle, and supplies car azimuth information to the controller 10. A map data storage 4 includes a recording medium, such as a magnetic disc, a CD-ROM or a DVD (digital versatile disc), to store map data. The map data includes information about all crossings on the roads. The crossing information contains a type (e.g., three-way crossing, four-way crossing, five-way crossing, or roundabout) and a location (e.g., longitude and latitude) of every crossing. The recording medium also stores image data of heading direction guidance maps shown in FIGS. 2A to 2C and image data of a roundabout shown in FIG. 5. The map of FIG. 2A is used to guide the vehicle straight, the map of FIG. 2B is used to guide the vehicle to the right, and the map of FIG. 2C is used to guide the vehicle to the left. The map of FIG. 5 shows a fundamental circular route RP of the roundabout, without branching routes (directions) except for a route AM. The route AM is an entering route of a vehicle. The controller 10 has a built-in ROM (read only memory) and three registers RA, RB and RC.

An actual roundabout may not be a perfect circle. The image of the FIG. 5 is prepared by, for example, deforming an actual roundabout such that the deformed roundabout includes the circular route RP and the approaching route AM.

The map data storage 4 retrieves particular map data in response to a map data request supplied from the controller 10, and sends the retrieved map data to the controller 10. An operation unit 5 receives data and instructions from a user of the car navigation apparatus 1, and generates and sends a corresponding signal to the controller 10. The data and instructions are entered to the operation unit 5 by a user's voice and/or key operations. A display unit 6 displays images and data in accordance with information provided from the controller 10. A voice generator 7 receives announcement data from the controller 10 and produces a corresponding voice signal. The voice signal is transmitted to a speaker 7a so that a voice is uttered from the speaker 7a on the basis of the voice signal. In general, the user of the car navigation apparatus 1 is a vehicle driver or a passenger.

It should be assumed here that the user of the car navigation apparatus 1 operates the operation unit 5 to specify a destination. The controller 10 then stores destination location information in a memory 8. The destination location information includes the latitude and longitude of the destination. The controller 10 also retrieves the image data of FIGS. 2A to 2C from the map data storage 4, and stores the image data in the memory 8.

Subsequently, the controller 10 executes a route guidance control (optimal route determination control) based on a program stored in the ROM.

Firstly, the controller 10 calculates a current location of the vehicle based on vehicle position information and azimuth information supplied from the GPS receiver 2 and azimuth sensor 3. The controller 10 then reads road map data, which covers a certain area including the vehicle's current location, from the recording medium in the map data storage 4. The controller 10 determines a plurality of possible routes to the destination from the vehicle's current location, and decides an optimal route OR under a certain condition. The condition may be "shortest route" or "fastest route". The controller 10 retrieves all crossing information from the map data, and stores the crossing information in the memory 8. The "all crossing information" is information about all the crossings, including roundabouts, which exist on a map currently displayed by the display unit 6 or which exist in the road map data stored in the map data storage 4. The controller 10 generates and supplies map image data to the display unit 6 such that a car location mark MC is superposed on the GPS-detected vehicle location in the displayed map and a red line (bold line in the illustration) OR is drawn along or over the optimal route on the displayed map. Accordingly, the display unit 6 shows a map image as shown in FIG. 1. The flag OM designates the destination.

Figure 6:
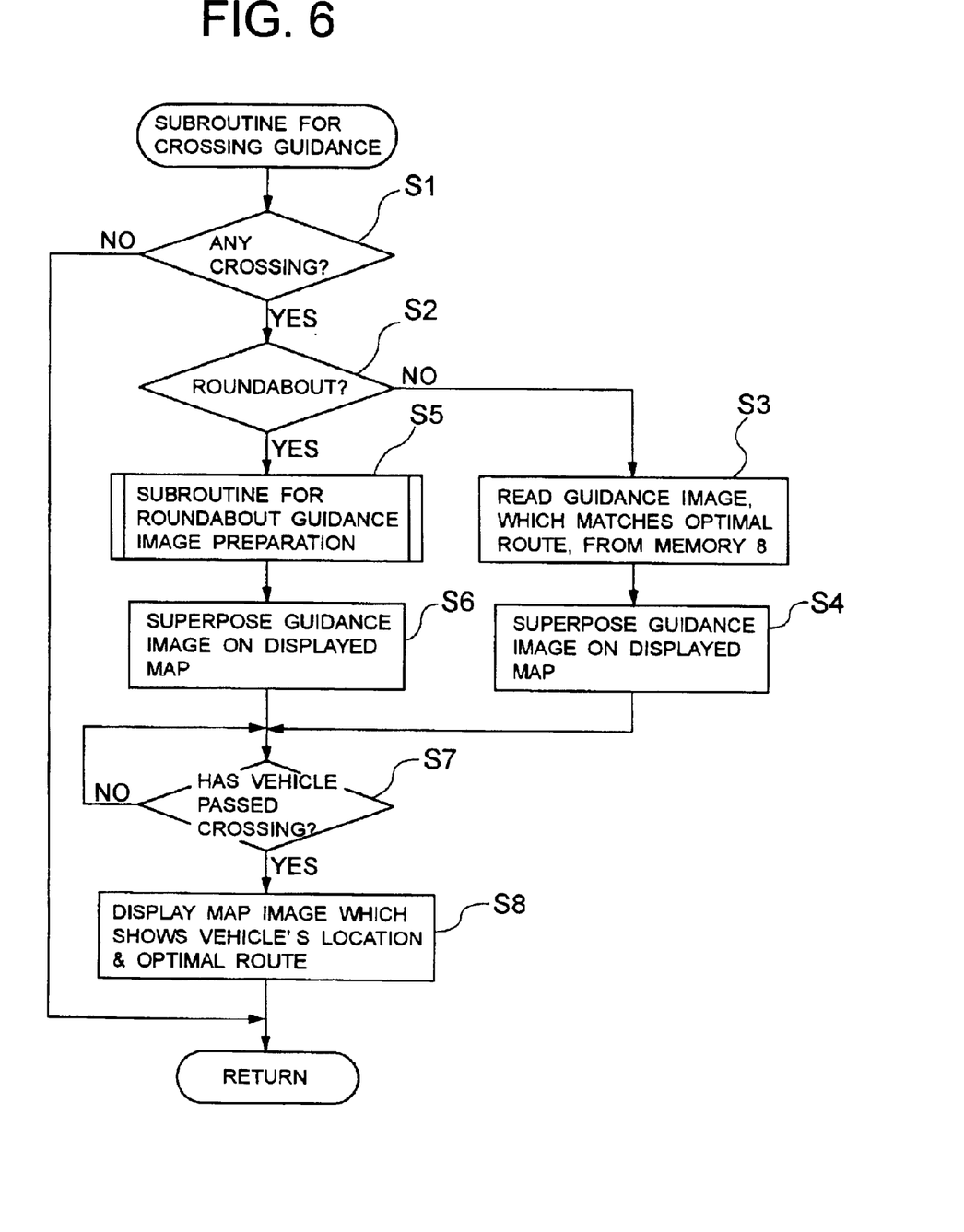
FIG. 6 illustrates a flowchart of a subroutine to prepare a heading direction guidance image at a crossing.

During the above described route guidance control (or the optimal route determination process), the controller 10 repeats, at predetermined intervals, a subroutine for crossing guidance as shown in FIG. 6.

Figure 7:
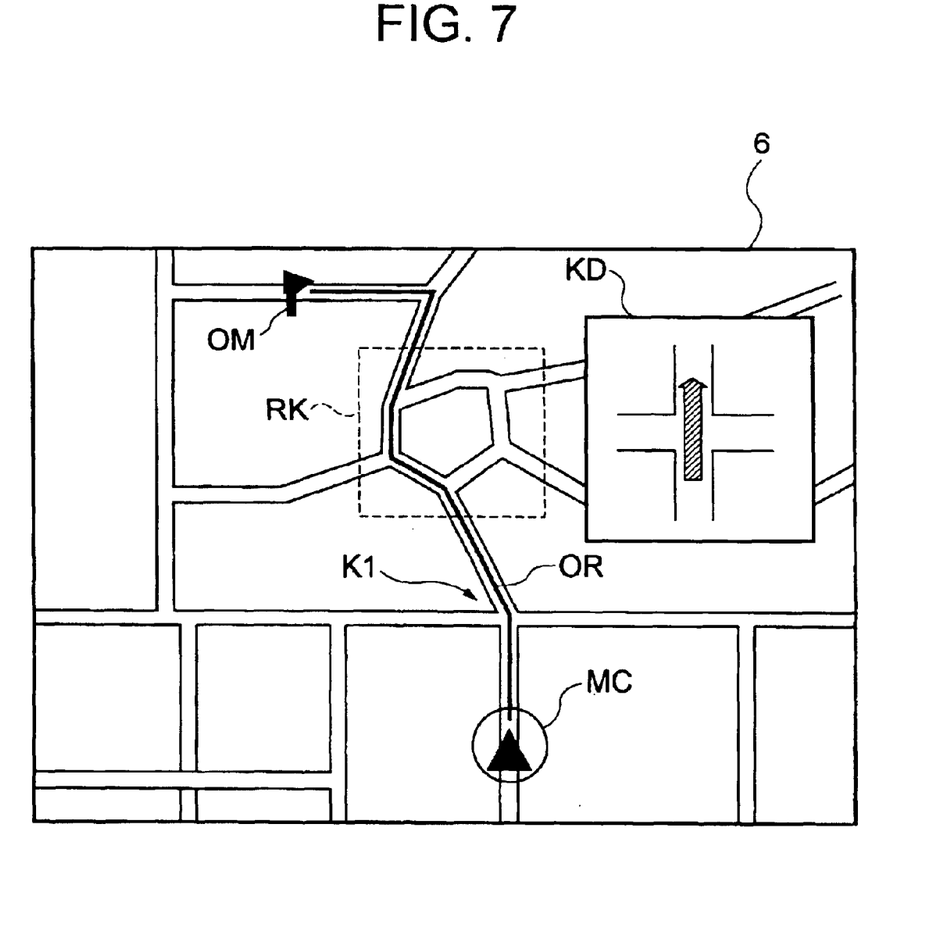
FIG. 7 illustrates a map displayed by the car navigation apparatus of FIG. 4 together with a heading direction guidance image for a four-way crossing.

In FIG. 6, the controller 10 first determines whether there is a crossing a certain distance ahead from the vehicle's current location, based on the crossing information (Step S1). If Step S1 determines that there is no crossing in the vehicle's heading direction, the controller 10 exits the subroutine and returns to the above described route guidance control. On the other hand, if Step S1 determines that there is a crossing ahead, the controller 10 determines whether the crossing is a roundabout, based on the crossing information (Step S2). If Step S2 determines that the crossing is not a roundabout (e.g., when the vehicle is approaching the crossing K1), the controller 10 retrieves image data, which represents the image of FIG. 2A, 2B or 2C, from the memory 8 (Step S3). The image of FIG. 2A, 2B or 2C is selected such that the vehicle is guided along the optimal route OR previously determined in the route guidance control. If the vehicle is approaching the crossing K1, the image of FIG. 2A is selected. The controller 10 then generates and supplies image data to the display unit 6 such that the selected image (FIG. 2A) is superposed on the map of FIG. 1 (Step S4). Accordingly, the display unit 6 shows a map as shown in FIG. 7. This map includes the superposed image KD (FIG. 2A) which shows the heading direction at the crossing K1.

Figure 8:
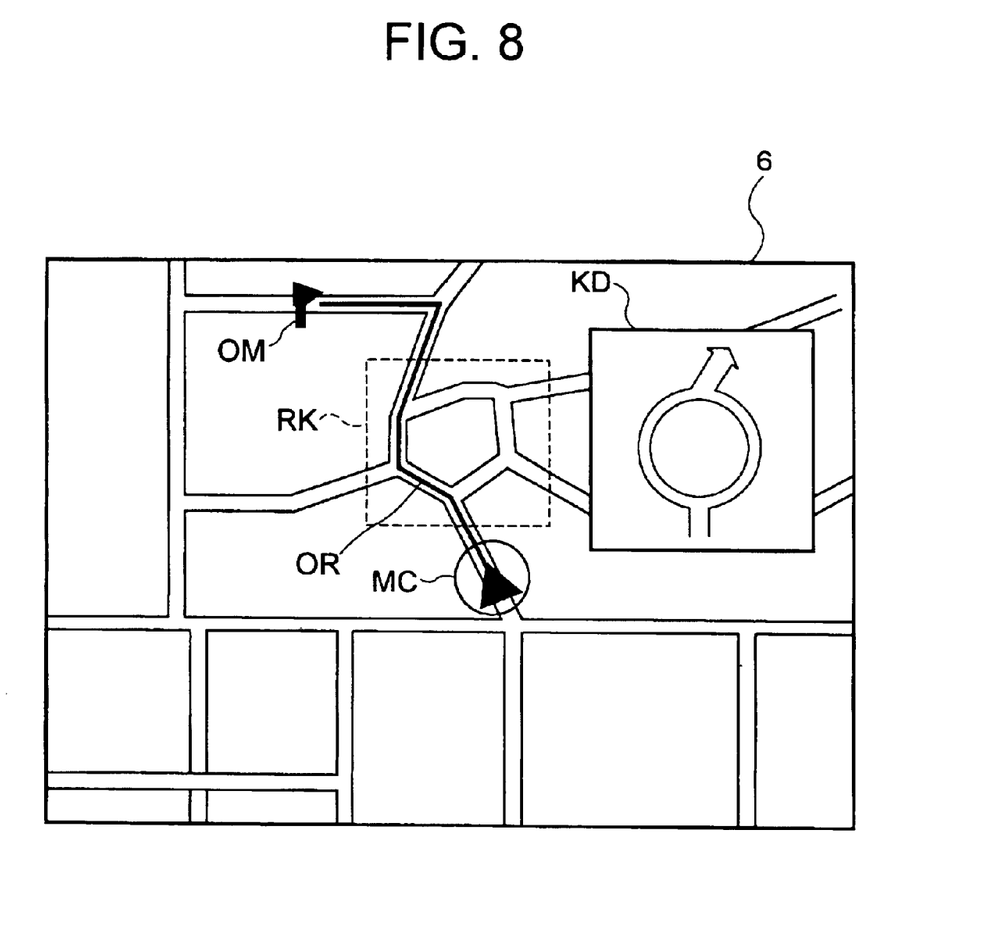
FIG. 8 illustrates a map displayed by the car navigation apparatus of FIG. 4 together with a heading direction guidance image for a roundabout.

On the other hand, if Step S2 determines that the crossing ahead is a roundabout (e.g., if the vehicle is approaching the roundabout RK), the controller 10 enters a subroutine for the roundabout guidance image preparation (Step S5). The roundabout guidance image preparation subroutine generates guidance image data which shows the entering route to the roundabout and shows the exit route from the roundabout. The detail of the roundabout guidance image preparation subroutine will be described later. The controller 10 then produces and sends the guidance image data to the display unit 6 such that the guidance image prepared at Step S5 is superposed on the displayed map of FIG. 1 (Step S6). As a result, the display unit 6 shows a map as shown in FIG. 8. The map displayed by the display unit 6 now includes the superposed image KD for the complicated crossing RK.

After Step S4 or S6, the controller 10 determines whether the vehicle has passed the crossing (Step S7). Step S7 is repeated until the answer is YES. When Step S7 determines that the vehicle has passed the crossing, the controller 10 generates and sends another image data to the display unit 6 such that a car mark MC is superposed on the GPS-determined current location of the vehicle and the selected optimal route OR is shown in red by the displayed map (Step S8). Consequently, the display unit 6 shows a map similar to FIG. 1 which does not include the crossing guidance image KD.

The roundabout guidance image preparation subroutine (Step S5) will be described with reference to FIGS. 9 and 10.

Figure 9:
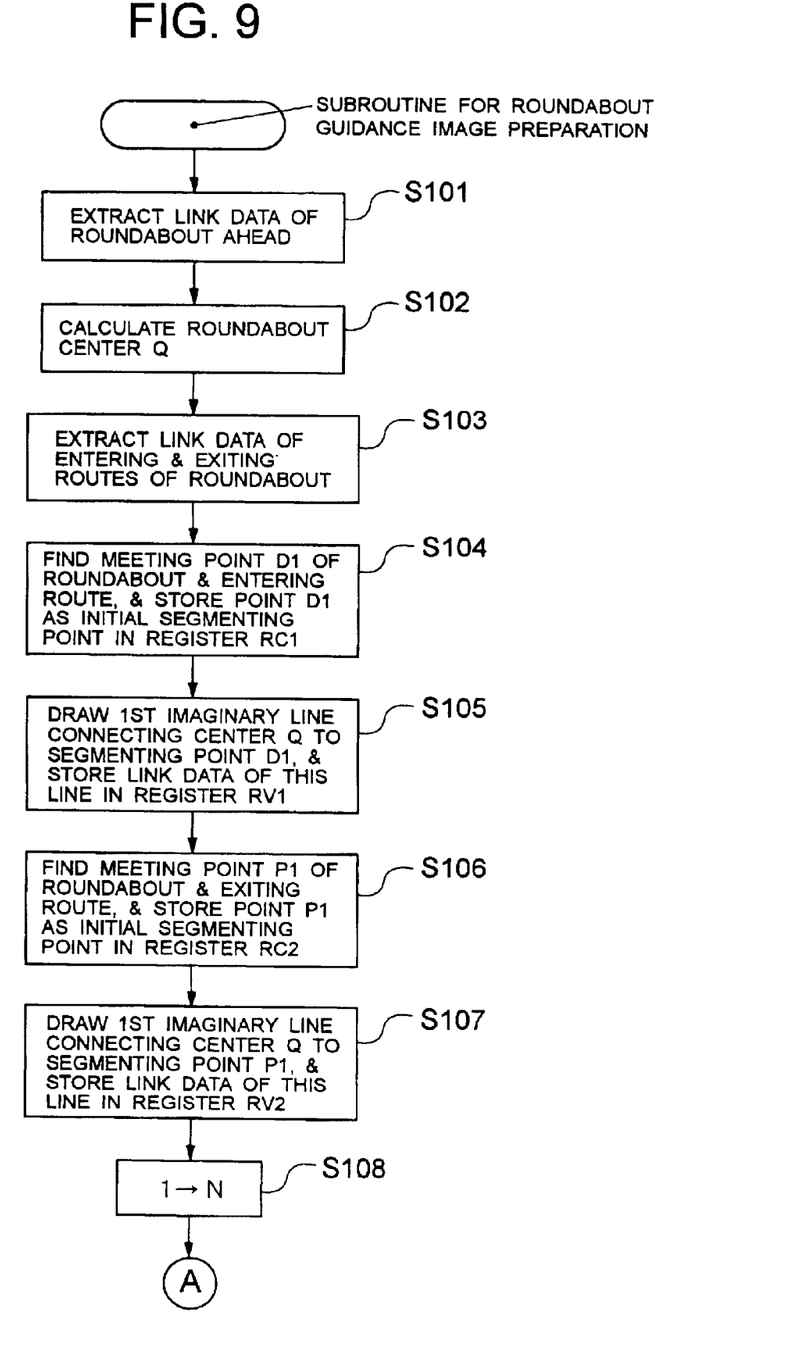
FIGS. 9 and 10 illustrate in combination a flowchart of a subroutine to prepare the heading direction guidance image for the roundabout.
Figure 10:
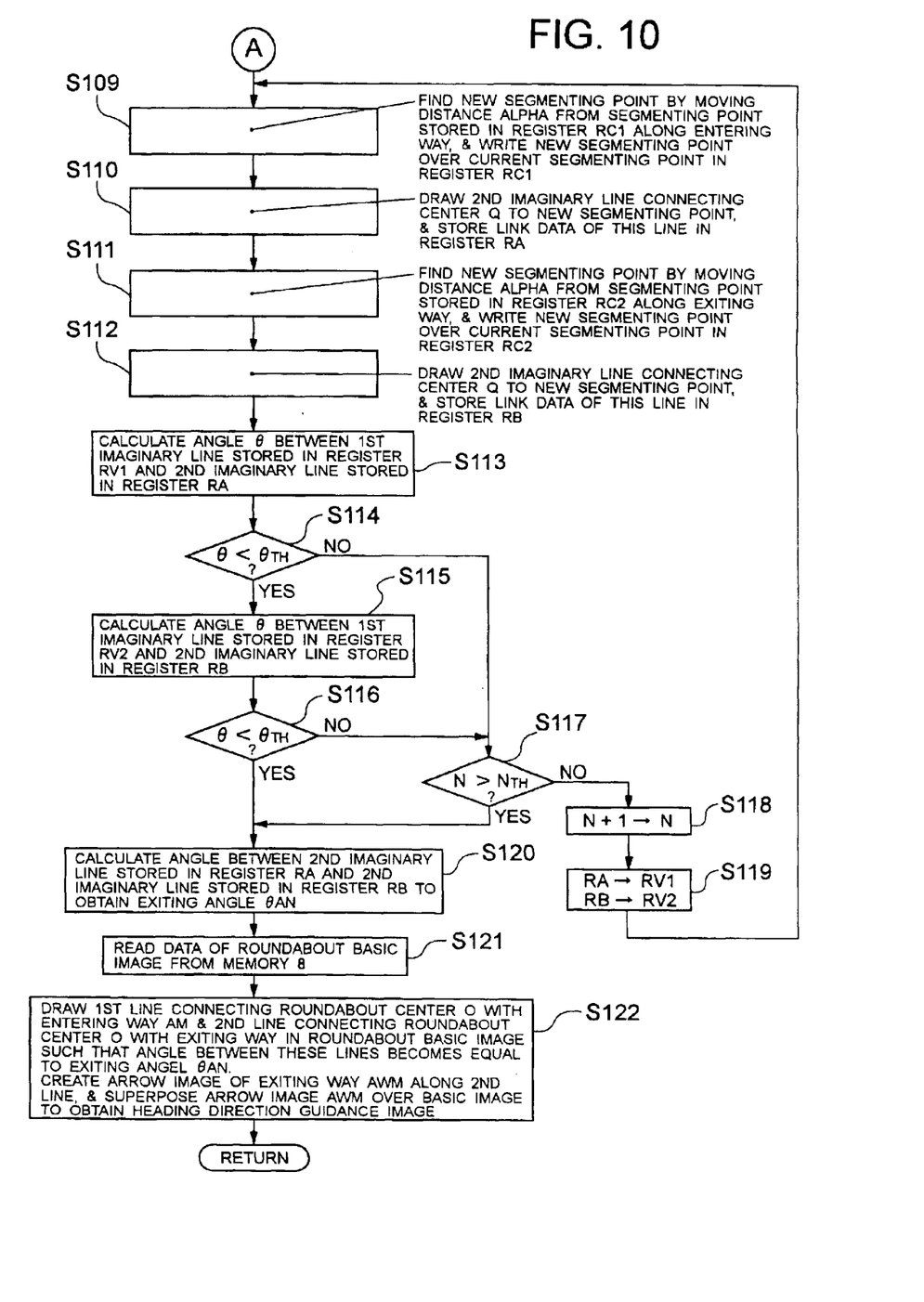

FIGS. 9 and 10 show in combination a single flowchart for the subroutine of Step S5.

Figure 11:
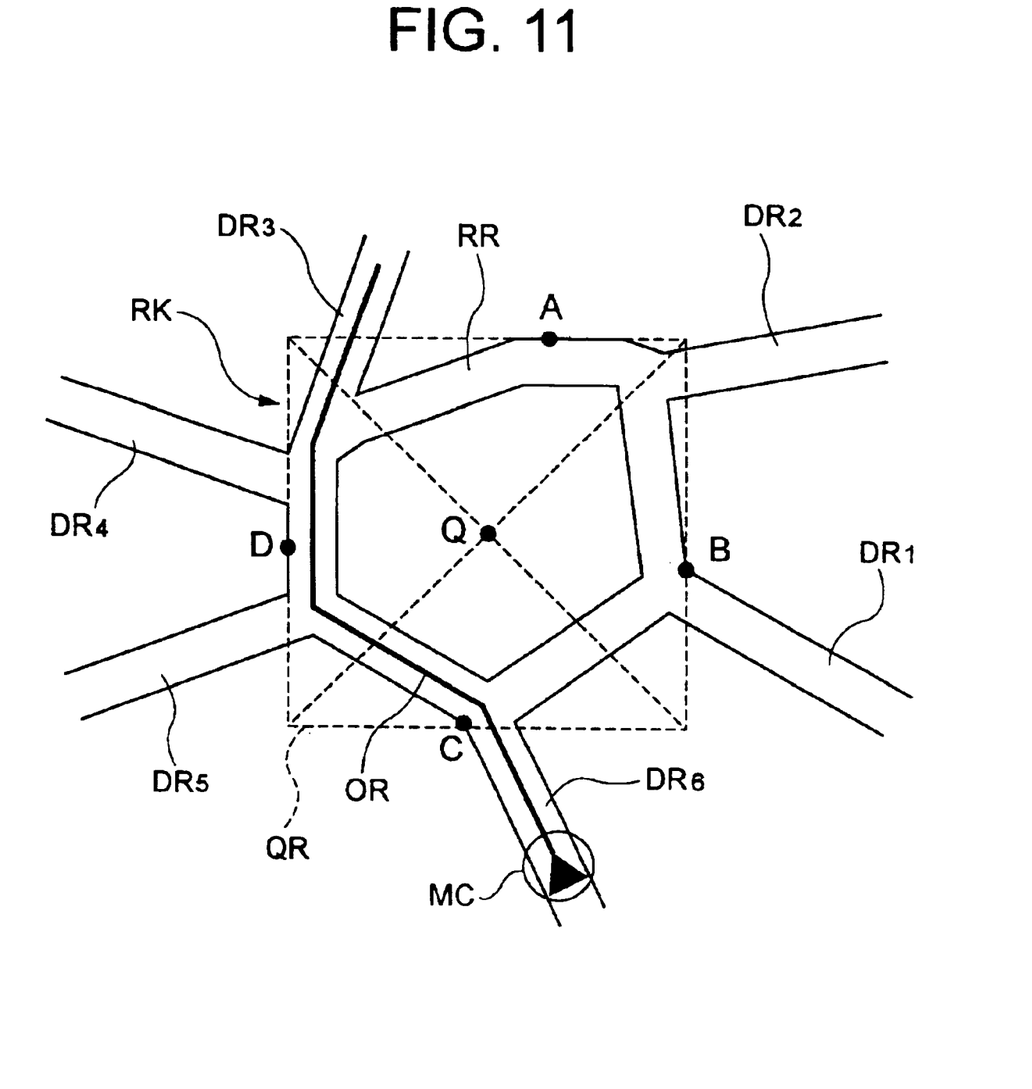
FIG. 11 illustrates a diagram to show how to calculate a center of a roundabout.

The controller 10 first extracts link data related to the roundabout RK on the optimal route OR, from the map data used in the optimal route determination process (Step S101). The controller 10 then determines a center Q (FIG. 11) of the roundabout RK based on the link data (Step S102). FIG. 11 illustrates a roundabout RK having a circular route RR and six branching routes DR1 to DR6. It should be assumed here that the vehicle is approaching the roundabout RK shown in FIG. 11, and the optimal route OR extends from the route DR6 to the route DR3. In order to determine the roundabout center Q, the controller 10 determines (calculates) outermost points A to D of the roundabout RK in four directions (up, down, right and left directions), draws a quadrangle QR including the four outermost points A to D as indicated by the broken line, and determines a crossing point of two diagonals based on the link data. The crossing point is considered to be the center Q of the roundabout RK. The controller 10 extracts link data of the entering route DR6 and the exiting route DR3 (i.e., link data of the two routes on the optimal route OR) from link data of all the branching routes DR1 to DR6 of the roundabout RK (Step S103).

After that, the controller 10 determines a connecting point D1 between the circular route RR and the entering route DR6 and stores data of the connecting point D1 (FIG. 12), as an initial segmenting point (division point) of the entering route, in a register RC1 (Step S104). The connecting point D1 is stored in the register RC1 as the initial segmenting point. The controller 10 draws a first imaginary line connecting the initial segmenting point D1 to the center Q of the roundabout RK. The controller 10 stores link data, which represents the first imaginary line, in an imaginary line register RV1 (Step S105).

Figure 12:
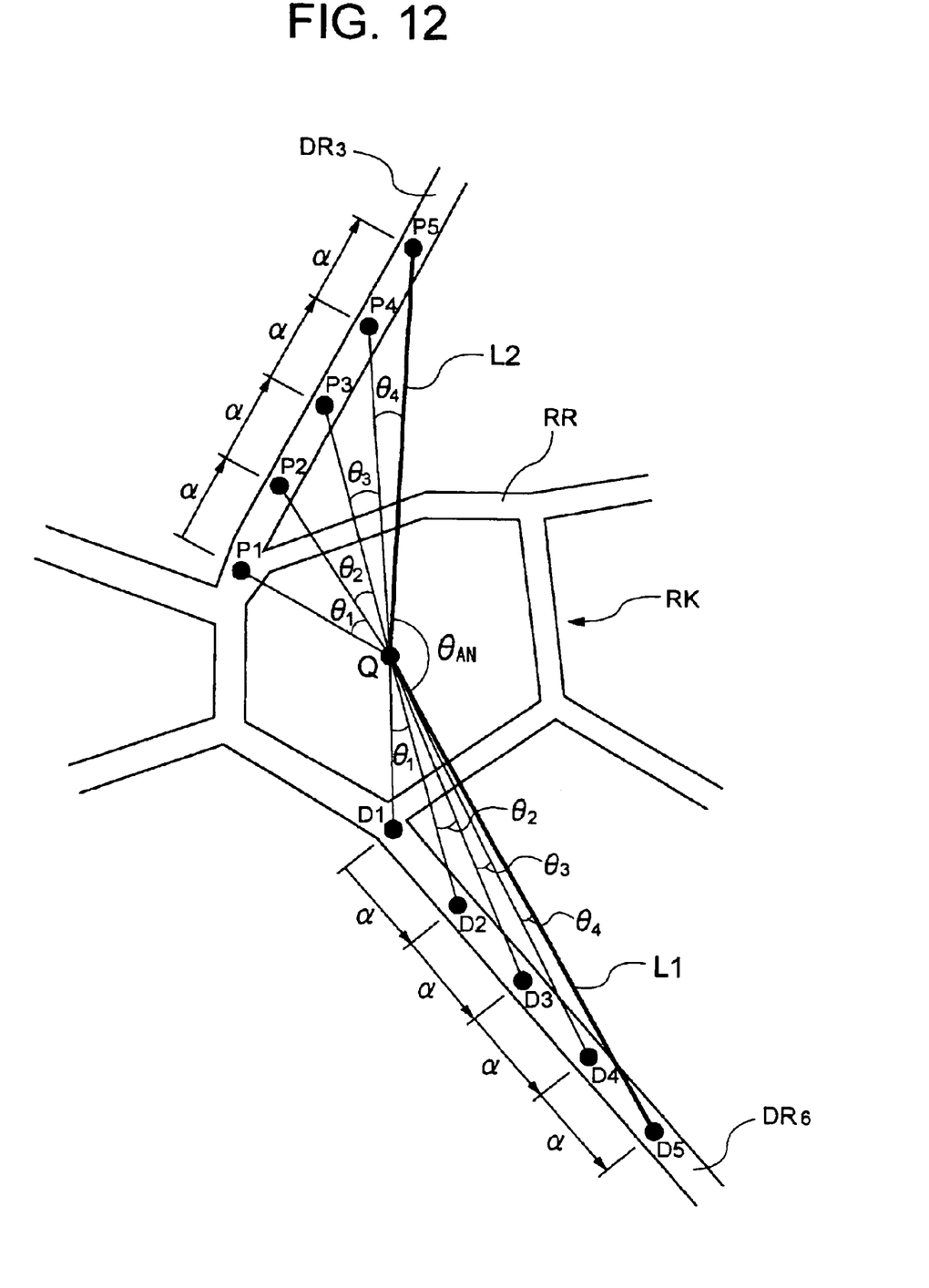
FIG. 12 is an illustration to show how to calculate an exiting angle of the roundabout.

Next, the controller 10 determines a connecting point P1 between the circular route RR and the exit route DR3 and stores the connecting point P1 in a register RC2 as an initial segmenting point of the exiting route (Step S106). The controller 10 draws a first imaginary line connecting the initial segmenting point P1 to the center Q of the roundabout RK. The controller 10 stores link data, which represents the first imaginary line, in an imaginary line register RV2 (Step S107). The controller 10 stores "1", as an initial value of the number of segmenting point movements N, in a built-in register (Step S108).

The controller 10 then determines another segmenting point D2 by moving a predetermined distance α (alpha) from the segmenting point D1 along the entering route DR6, and updates the data stored in the register RC1 by overwriting the segmenting point D2 over the segmenting point D1 in the register RC1 (Step S109). The controller 10 draws a second imaginary line connecting the new segmenting point D2 to the roundabout center Q, and stores link data which represents the second imaginary line in the hypothetical entering route register RA (Step S110). Likewise, the controller 10 determines another segmenting point P2 by moving the predetermined distance α from the segmenting point P1 along the exit route DR3, and updates the data stored in the register RC2 by overwriting the segmenting point P2 over the segmenting point P1 in the register RC2 (Step S111). The controller 10 draws a second imaginary line connecting the new segmenting point P2 to the roundabout center Q, and stores link data which represents the second imaginary line in the hypothetical exit route register RB (Step S112).

The controller 10 determines an angle θ1 between the first imaginary line stored in the register VR1 and the second imaginary line stored in the register RA (Step S113). The controller 10 determines whether the angle θ1 is smaller than a predetermined value θTH (Step S114). If Step S114 determines that the angle θ1 is smaller than the predetermined value θTH, the controller 10 determines an angle θ1 between the first imaginary line stored in the register VR2 and the second imaginary line stored in the register RB (Step S115). The controller 10 determines whether the angle θ1 is smaller than the predetermined value θTH (Step S116). If Step S116 determines that the angle θ1 is not smaller than the predetermined value θTH, the controller 10 determines whether the number of segmenting point movements N, stored in the built-in register, is greater than a predetermined upper limit $N_{TH}$ (Step S117). If Step S117 does not determine that the value N is greater than the upper limit $N_{TH}$, the controller 10 adds "1" to the value N in the built-in register, thereby updating the value N (Step S118). The controller 10 then recognizes the second imaginary line stored in the register RA as a new first imaginary line, and writes the data of the new first imaginary line over the data stored in the register VR1 (Step S119). The controller 10 also recognizes the second imaginary line stored in the register RB as a new first imaginary line, and writes the new first imaginary line over the data stored in the register VR2 (Step S119). After Step S119, the controller 10 returns to Step S109 to repeat the above described steps.

Therefore, Steps S109 to S119 are repeated until both of the answers at Steps 114 and 116 are YES, or until the value N becomes greater than the upper limit $N_{TH}$ at Step S117.

By repeatedly executing Steps S109 to S119, a plurality of segmenting points D1, D2, D3, . . . are defined along the entering route DR6 of the roundabout RK at the constant intervals α as shown in FIG. 12. Likewise, a plurality of segmenting points P1, P2, P3, . . . are defined along the exiting route DR3 at the constant intervals α. Further, the angle θi (θ1, θ2, θ3, . . . ) defined by two adjacent lines extending from the roundabout center Q to each two adjacent segmenting points are successively compared with the threshold angle $\theta_{TH}$. When the angle θi on the entering route DR6 side and the angle θi on the exiting route DR3 side are both smaller than the threshold angle $\theta_{TH}$, the link data representing the line connecting the roundabout center Q to the most recently stored segmenting point Di on the entering route DR6 is ultimately registered in the register RA and the link data representing the line connecting the roundabout center Q to the most recently stored segmenting point Pi on the exiting route DR3 is ultimately registered in the register RB. In FIG. 12, the angle θ4 between the line connecting the division point D4 with the center Q and the line L1 connecting the division point D5 with the center Q is smaller than the angle $\theta_{TH}$, and the angle θ4 between the line connecting the division point P4 with the center Q and the line L2 connecting the division point P5 with the center Q is smaller than the angle $\theta_{TH}$. Therefore, the line L1 is the ultimate imaginary entering route and the line L2 is the ultimate imaginary exiting route. The term "imaginary entering route" is a hypothetical route for the vehicle when the vehicle, at a certain location on the entering route DR6, is assumed to proceed toward the roundabout center Q from the entering route DR6. The term "imaginary exiting route" is a hypothetical route for the vehicle when the vehicle is assumed to proceed from the roundabout center Q toward a certain point on the exiting route DR3.

When it is determined at Step S116 that the angle θi is smaller than the predetermined angle θTH, or when it is determined at Step S117 that the number N of the segmenting point movements is greater than the upper limit $N_{TH}$, then the controller 10 executes Step S120.

Figure 13:
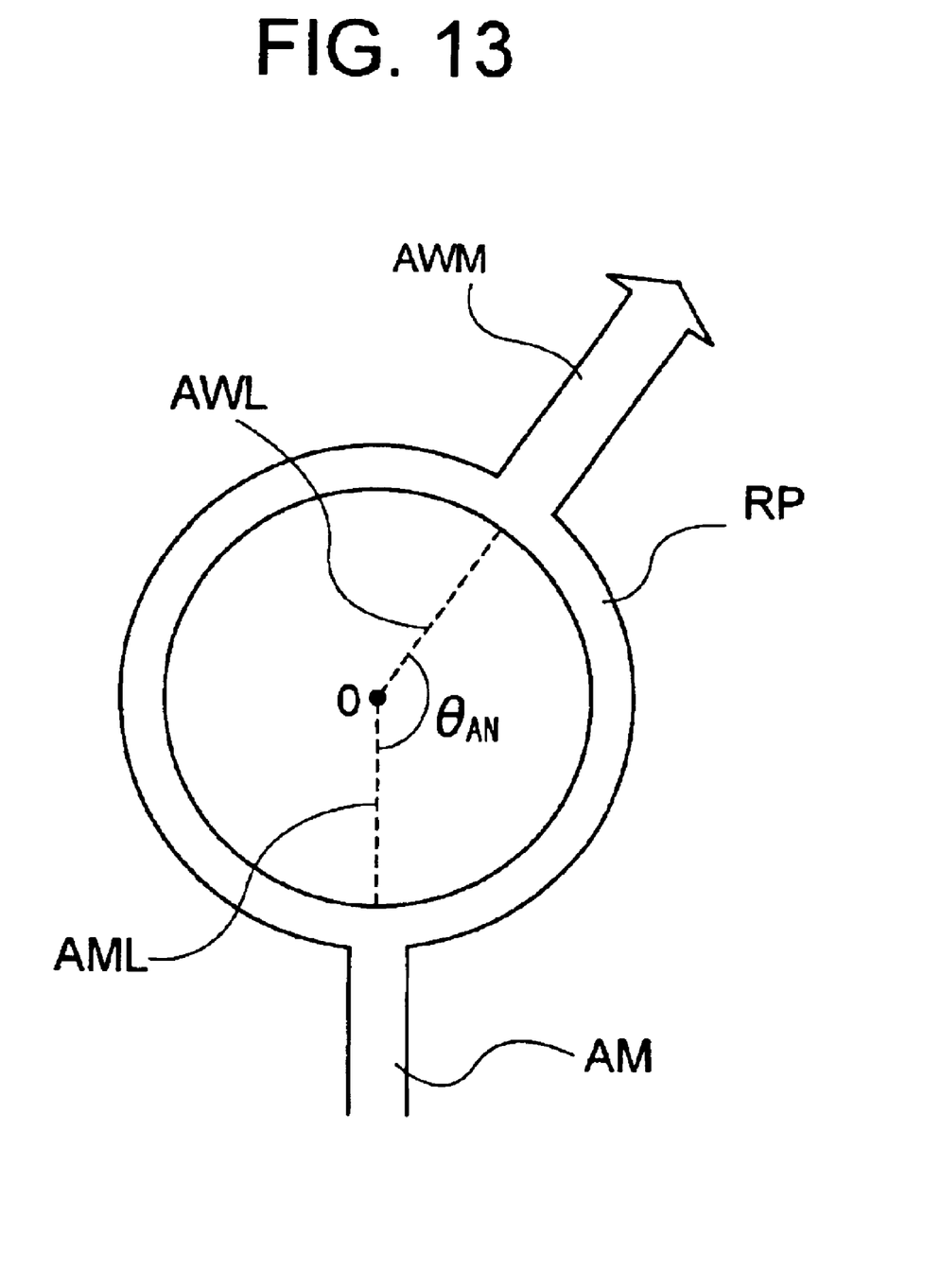
FIG. 13 illustrates an example of the heading direction guidance image at the roundabout.

At Step S120, the controller 10 calculates an angle θAN (referred to as "exiting angle") between the imaginary entering route stored in the register RA and the imaginary exiting route stored in the register RB. Subsequently, the controller 10 retrieves the image data of FIG. 5, which represents the basic image of the roundabout for the vehicle entering the roundabout (Step S121). Referring also to FIG. 13, the controller 10 draws a first line connecting the center O of the roundabout image to the entering route image AM, as indicated by the broken line AML, and draws a second line AWL from the center O at the angle θAN. The second line AWL can be drawn by rotating the first line AML counterclockwise by the angle θAN. An image of the arrow AWM is created such that the arrow AWM extends radially outwards from the roundabout circular image RP in the direction of the second line AWL (Step S122). The image of FIG. 13 is the heading direction guidance image. The image of FIG. 13 includes the circular route image RP, the entering route mark AM and the exiting route mark AWM. The entering route mark AM is angularly spaced from the exiting route mark AWM by the angle θAN with respect to the center O. The entering route mark and exiting route mark do not extend inside the circular route RP.

After Step S122, the controller 10 exits the subroutine of FIGS. 9 and 10 (i.e., subroutine for preparing a heading direction guidance image), and returns to Step S11 of FIG. 6.

By executing the optimal route preparation subroutine and the heading direction guidance image preparation subroutine shown in FIG. 6, the navigation apparatus 1 creates and shows the heading direction guidance image (FIG. 13) in the display unit 6 as the vehicle approaches the roundabout. Of course, when the vehicle is encountering a roundabout other than that shown in FIG. 11, a heading direction guidance image which matches the encountering roundabout is prepared in accordance with the shape of the encountering roundabout.

In the illustrated and described embodiment, the operation and control of the navigation apparatus 1 is described in connection with the optimal route guidance to the destination. When the navigation apparatus 1 does not prepare the optimal route guidance image OR, the navigation apparatus 1 may create an image of all branching routes of a roundabout by a deforming process, and superpose the image over the displayed map.

Figure 14:
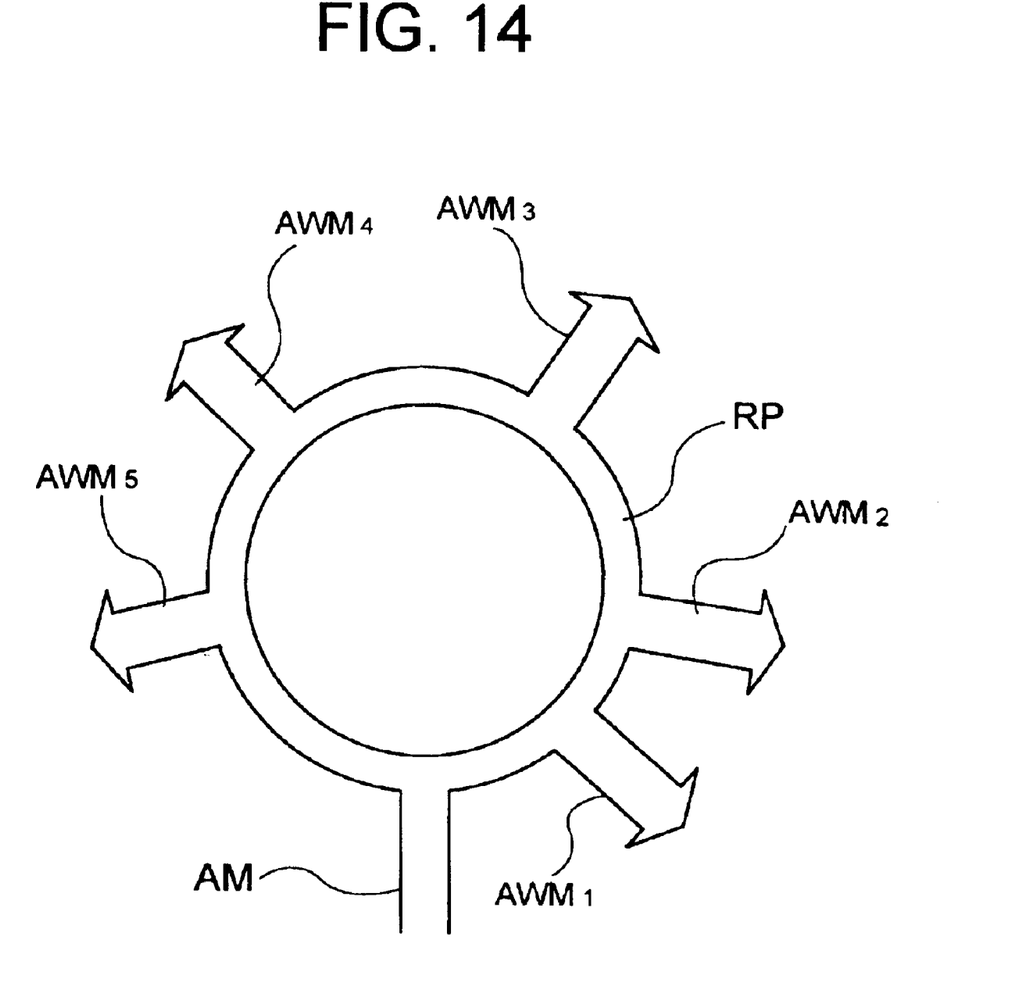
FIG. 14 illustrates another example of the heading direction guidance image at the roundabout.

FIG. 14 illustrates an exemplary image which shows all the branching routes of the roundabout. The image of FIG. 14 is the heading direction guidance image at the roundabout, which will be superposed over the displayed map, when the vehicle is approaching the roundabout RK from the entering route DR6 in FIG. 11 but the navigation apparatus 1 does not perform the optimal route guidance control (optimal route determination control). In this instance, when the vehicle is approaching the roundabout RK, the controller 10 calculates the exiting angle θAN for each of the branching routes DR1 to DR5 by performing the exiting angle determination process shown and described in connection with FIGS. 9 to 12. Then, the controller 10 prepares an image shown in FIG. 14. In this drawing, arrows AWM1 to AWM5, which correspond to the branching routes DR1 to DR5, extend outwards from the circular route RP such that the arrows have respective exiting angles θAN1 to θAN5. The entering route mark AM corresponds to the entering route DR6. The image of FIG. 14 is superposed on the displayed map in the display unit 6.

This application is based on a Japanese patent application No. 2002-75539, and the entire disclosure thereof is incorporated herein by reference.

What is claimed is:

1. A route guidance apparatus for displaying a heading direction guidance image on a display unit when a moving body enters a roundabout having a plurality of branching routes extending from the roundabout, the moving body taking a first route of the plurality of branching routes to enter the roundabout and a second route of the plurality of branching routes to exit the roundabout, the apparatus comprising:

a link data extractor for extracting link data of the roundabout from road map data;

a calculator for determining an angle between the first and second routes based on the link data as an exiting angle of the roundabout; and an image generator for preparing a first image showing a direction of the exiting angle as the heading direction guidance image.

2. The route guidance apparatus according to claim 1, wherein the image generator further generates a second image of the roundabout and a third image of the first route, the first image being an exiting mark and the third image being an entering route mark, and the image generator creating a combined image of the first, second and third images such that the exiting mark is angularly spaced from the entering route mark by the exiting angle with respect to a center of the roundabout.

3. The route guidance apparatus according to claim 1 further comprising a controller for superposing the heading direction guidance image over a map displayed by the display unit.

4. The route guidance apparatus according to claim 2 further comprising a controller for superposing the combined image over a map displayed by the display unit.

5. A route guidance method for displaying a heading direction guidance image on a display unit when a moving body enters a roundabout having a plurality of branching routes extending from the roundabout, the moving body taking a first route of the plurality of branching routes to enter the roundabout and a second route of the plurality of branching routes to exit the roundabout, the method comprising:

extracting link data of the roundabout from road map data;

calculating an angle between the first and second routes based on the link data as an exiting angle of the roundabout; and preparing a first image showing a direction of the exiting angle as the heading direction guidance image.

6. The route guidance method according to claim 5 further comprising preparing a second image of the roundabout and a third image of the first route, and preparing a combined image of the first, second and third images such that an exiting mark is angularly spaced from an entering route mark by the exiting angle with respect to a center of the roundabout.

7. The route guidance method according to claim 5 further comprising superposing the heading direction guidance image over a map displayed by the display unit.

8. The route guidance method according to claim 6 further comprising superposing the combined image over a map displayed by the display unit.

9. A navigation apparatus for a vehicle, comprising:

a data storage for storing road map data;

a detector for determining a current location of the vehicle;

a display unit for displaying a road map of a certain area including the current location of the vehicle, data of the road map of the certain area being retrieved from the road map data;

a car mark generator for superposing a car mark at the current location of the vehicle on the displayed road map;

a data extractor for extracting data of a roundabout having a plurality of branching routes extending from the roundabout from the road map data when the vehicle enters the roundabout, the vehicle taking a first route of the plurality of branching routes to enter the roundabout and a second route of the plurality of branching routes to exit the roundabout;

a calculator for determining an angle between the first and second routes based on the data of the roundabout;

an image generator for preparing a first image showing a direction of the angle; and a controller for superposing the first image over the displayed road map.

10. The navigation apparatus according to claim 9, wherein the image generator further generates a second image of the roundabout and a third image of the first route, the first image being an exiting mark and the third image being an entering route mark, the controller creates a combined image of the first, second and third images such that the exiting mark is angularly spaced from the entering route mark by the angle with respect to a center of the roundabout, and the controller superposes the combined image over the displayed road map.

11. The navigation apparatus according to claim 9, wherein the second route is determined in accordance with an optimal route connecting the current location of the vehicle to a destination specified by a user of the navigation apparatus.

12. The navigation apparatus according to claim 9, wherein the detector determines the current location of the vehicle based on a GPS.

13. The navigation apparatus according to claim 9, wherein the image generator does not prepare the heading direction guidance image when the car navigation apparatus does not determine an optimal route from the current location of the vehicle to a destination.

14. A guidance image generation method for a vehicle, comprising:

detecting a current location of the vehicle;

extracting data about a roundabout from a road map data;

determining an entering route to the roundabout and an exiting route from the roundabout, based on the current location of the vehicle and the data about the roundabout;

determining an angle between the entering route and the exiting route as an exiting angle of the roundabout; and preparing an image showing a direction of the exiting angle as the guidance image.

15. The guidance image generation method according to claim 14 further comprising:

detecting a heading direction of the vehicle; and extracting data about that part of the roundabout which exists in the heading direction of the vehicle, based on the current location of the vehicle, the heading direction of the vehicle and the road map data.

16. The guidance image generation method according to claim 14 further comprising:

determining a center of the roundabout based on the data about the roundabout;

determining a first point on the entering route, which is apart from a meeting point of the roundabout and the entering route, based on a predetermined criteria;

drawing a first line from the center of the roundabout to the first point as an imaginary entering route;

determining a second point on the exiting route, which is apart from a meeting point of the roundabout and the exiting route, based on the predetermined criteria;

drawing a second line from the center of the roundabout to the second point as an imaginary exiting route; and determining an angle between the imaginary entering route and the imaginary exiting route as the exiting angle.

* * * * *